(No Model.) 2 Sheets—Sheet 1.

Q. BRUTON.
BRANDING AND DEHORNING DEVICE.

No. 571,428. Patented Nov. 17, 1896.

Witnesses:
F. G. Fischer

Inventor
Qualls Bruton.
by Higdon & Higdon
Attys (No Model.) 2 Sheets—Sheet 2.
Q. BRUTON.
BRANDING AND DEHORNING DEVICE.
No. 571,428. Patented Nov. 17, 1896.
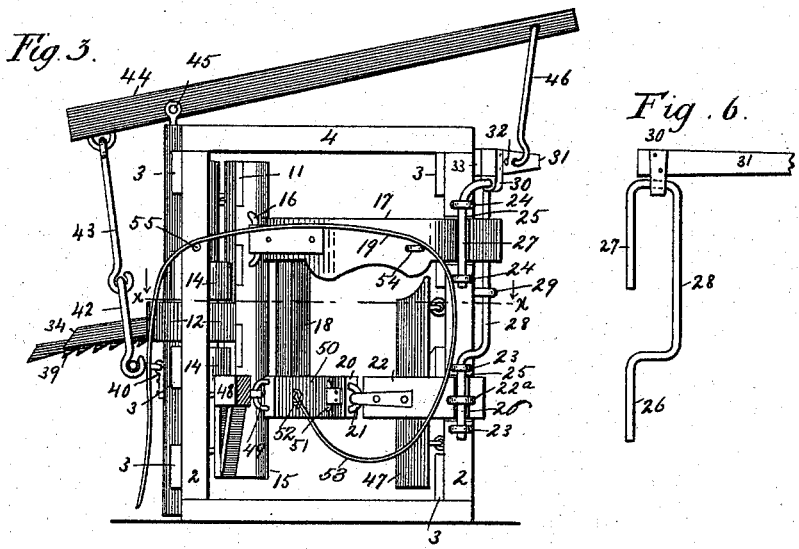
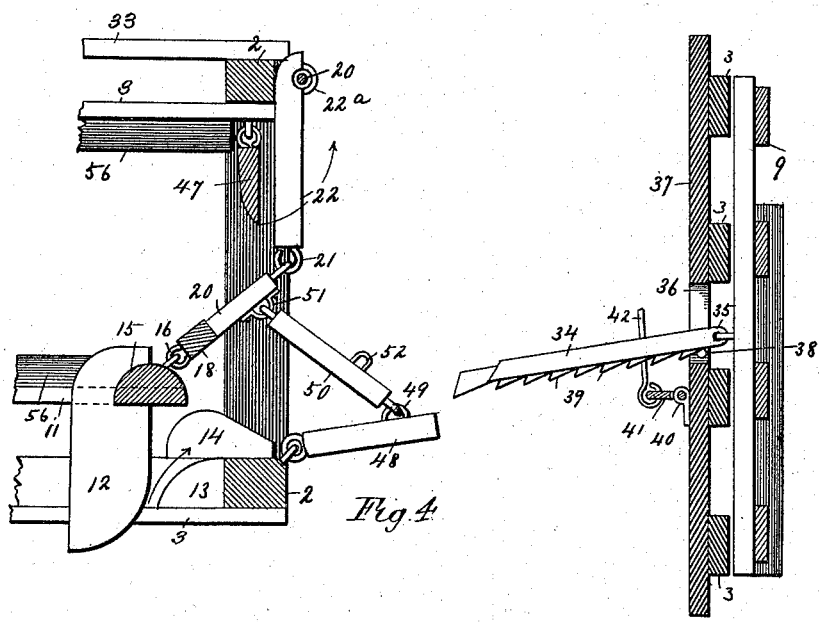
Witnesses:
F. G. Fischer
G. W. Thorpe
Inventor:
Qualls Bruton
by Higdon & Higdon
Att'ys

UNITED STATES PATENT OFFICE.

QUALLS BRUTON, OF KANSAS CITY, KANSAS.

BRANDING AND DEHORNING DEVICE.

SPECIFICATION forming part of Letters Patent No. 571,428, dated November 17, 1896.

Application filed March 6, 1896. Serial No. 582,157. (No model.)

*To all whom it may concern:*

Be it known that I, QUALLS BRUTON, of Kansas City, Wyandotte county, Kansas, have invented certain new and useful Improvements in Branding and Dehorning Cattle-Chutes, of which the following is a full, clear, and exact description, reference being had to the accompanying drawings, forming a part thereof.

My invention relates to branding and dehorning cattle-chutes; and it consists in certain novel and peculiar features of construction and combinations of parts hereinafter described and claimed.

The principal object of the invention is to produce an apparatus of this character whereby cattle may be quickly, easily, and securely held until branded or dehorned, and which at the same time will keep the cattle upon their feet during this operation.

A further object is to produce means for quickly and easily releasing the cattle after being operated upon.

A still further object of my invention is to produce a simple, strong, durable, and comparatively inexpensive apparatus which may be easily and at small expense arranged in proper position relative to an ordinary chute, if desired, or may be built in connection as an integral part of said chute, as desired.

Figure 1:
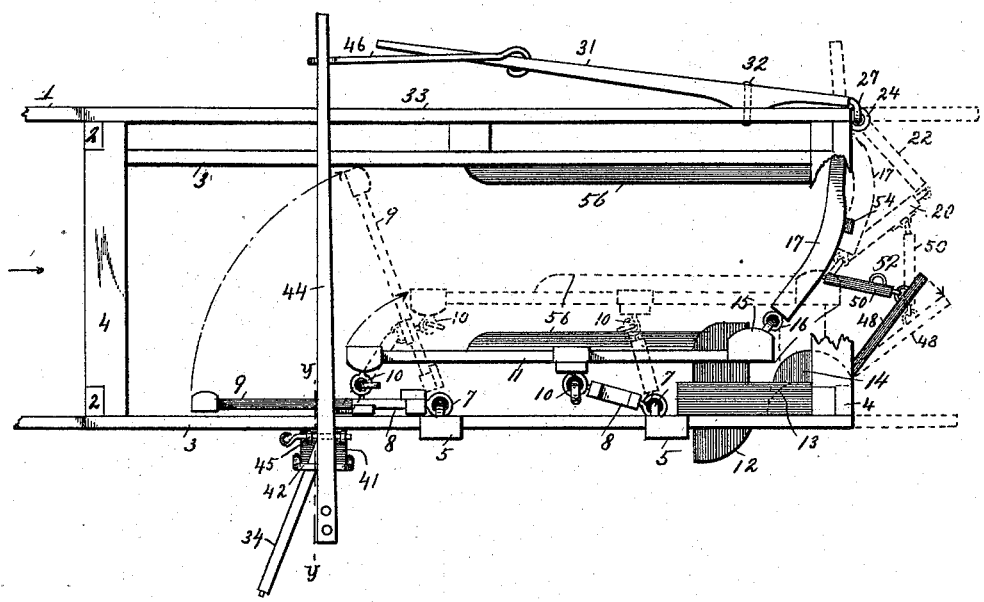
Figure 2:
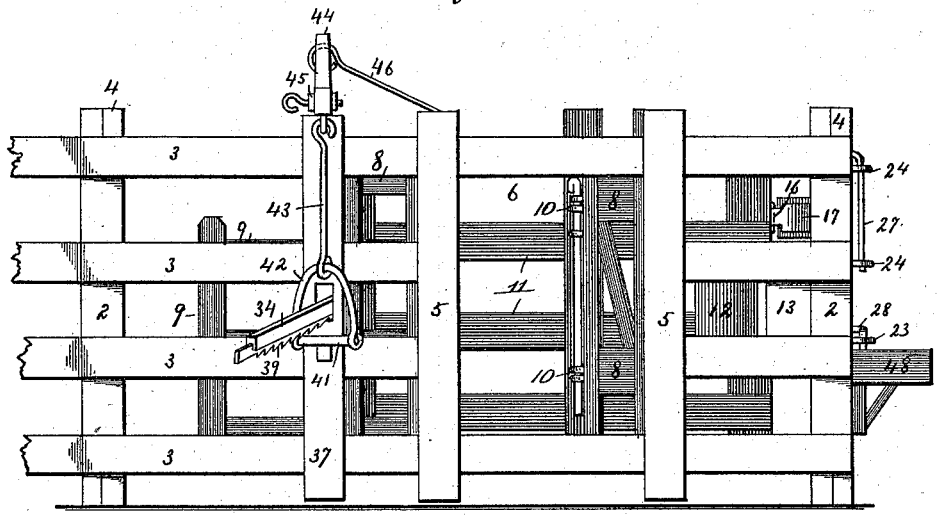

Referring to the drawings which illustrate the invention, Figure 1 represents a plan view of a cattle branding or dehorning chute embodying my invention. Fig. 2 represents a side elevation of the same. Fig. 3 represents a front view of the same. Fig. 4 represents a horizontal section taken on the line $x\,x$ of Fig. 3. Fig. 5 represents a vertical section taken on the line $y\,y$ of Fig. 1. Fig. 6 represents in detail a part of the lever and the rods or bolts carried thereby for closing the chute.

In said drawings, 1 designates the usual or any preferred form of cattle-chute. It comprises the customary posts 2 and the longitudinal rails 3 connecting the same. It may also be braced at its upper end by transverse bars 4, connecting the posts 2, if desired. At a suitable point in one side of the chute the intermediate rails 3 3 terminate at some distance from each other, or, in other words, are cut away, and are connected to the vertical and parallel bars or sills 5 5, in order to form between said bars or sills and the top and the bottom rails 3 an opening 6 through which a man may easily step. Hinged, as at 7, or in any other suitable manner to the inner sides of said bars or sills 5 are short gates or links 8, which are about the same height as said opening, and are constructed in any suitable manner. As shown, they consist of vertical and horizontal bars or rails, and one of them with an inclined brace. Their particular construction, however, is immaterial. One of them, the rearmost, is provided or formed with an extension 9, of such length that when the gate is swung to a position at nearly right angles to the rails 3 it comes in contact with the rails of the opposite side of the chute, as shown in dotted lines in Fig. 1, for a purpose hereinafter explained. Said short gates or links 8 are in turn hinged or pivotally connected, as at 10, to a longitudinal frame 11, which frame is also constructed of bars and rails, preferably. The rear gate 8 is pivotally connected to said frame at its rear end, while the front gate 8 is pivotally connected to the frame near its middle.

Secured to and projecting outwardly from the front of the frame is a guide-arm or brace 12, which, when the frame occupies the position illustrated in Fig. 2, projects outwardly beyond one side of the chute, and when the frame is swung to the position indicated in dotted lines said brace swings around past the block 13 in the direction indicated by the arrow, Fig. 4, and assumes a position between the superposed blocks 14, secured rigidly to the inner side of the chute. The arrangement of said arm between said blocks prevents the animal when secured in the chute in his struggles from injuring the frame or its hinges by reason of the great pressure applied at this point. To prevent the cattle injuring themselves, the vertical post at the front end of said frame is preferably rounded at its inner side, as shown at 15, and hinged to the same, as at 16, is a yoke-frame 17, consisting of a vertical bar 18, the upper transverse bar 19, and the lower transverse bar 20. The bar 19 is of such length that it may project clear across to and beyond the opposite side of the chute, while the bar 20 projects only about half-way across the intervening space, and is hinged, as shown at 21, to a link 22, which link at its opposite end is provided with a vertical eye 22ª, which registers when the chute is arranged to catch and hold a steer for branding or dehorning purposes—that is, when the yoke-frame is arranged to bridge the chute, as shown clearly in Fig. 3, in vertical alinement with eyebolts 23, secured rigidly to the corresponding side of the chute. Said eyebolts 23 are also arranged in vertical alinement with similar eyebolts 24, which are arranged above and below the bar 19 when it extends transversely of or bridges the chute. In order to permit of more or less pivotal motion of said bar 19 and link 22, the chute between the said eyebolts is preferably recessed or cut away, as shown at 25. They are held in such position by means of the vertical and longitudinally alined arms or rods 26 and 27, respectively, which are preferably formed integral with a vertical rod 28, extending loosely through a guide-eye 29, secured to the chute, and attached rigidly at its upper end to a bracket 30 of a lever 31, which lever is pivotally mounted, as at 32, upon a rail 33 and secured to the chute in the plane preferably of the upper rails 3, as shown most clearly in Figs. 1 and 3. Therefore it is obvious that by depressing this lever at any time the bolts or rods 26 and 27 are caused to release the bar 19 and the link 22 of the yoke-frame for a purpose hereinafter explained.

34 designates a bar which is pivotally connected at its inner end, as at 35, to the rearmost swinging gate 8 or its extension. Said bar extends through an opening 36 in a post 37, secured to the adjacent side of the chute, and above a rod or shoulder 38 bridging said opening, and adapted for engagement by one or another of the ratchet-teeth 39, depending from the bar 34. Said teeth may be formed in or secured to said bar 34, as shown, or in any other suitable or preferred manner. Pivoted to said bar 37, as at 40, is a trip-plate 41, which is adapted, when properly actuated, to engage the rack-bar 34 and cause its disengagement with the rod or shoulder 38, for a purpose hereinafter explained, and in order to properly operate said plate I preferably employ the links 42 and 43, which pivotally connect said plate with the transverse lever 44. Said lever is pivotally mounted, as at 45, at the upper side of the chute and is linked at its opposite end, as at 46, to the lever 31.

When it is desired to secure a steer in the chute in order to brand or dehorn him, the apparatus is first arranged, as shown in full lines Fig. 1, that is, the frame 11 is arranged in such a position as to leave the chute-passage as clear and wide as possible, while its front end is connected to the opposite side of the chute at its discharge or outlet end by means of the yoke-frame, arranged as shown most clearly in Figs. 3 and 4. In this position it will be noticed that the opening formed by the yoke-frame in a full-sized machine will be amply sufficient for the steer's head to pass easily through, and will be about in the same horizontal plane. It will now be observed that as a steer passes through the chute in the direction indicated by the arrow, Fig. 1, he naturally makes a break for the opening formed by said yoke-frame, as this apparently is his only means of escape, and he comes with considerable force against the same. Immediately he does this, the pressure applied causes the yoke to yield forwardly and to swing to the position indicated in dotted lines in Fig. 1, and at the same time this causes the frame 11 and the gates 8 to swing in the direction indicated in same figure. In case the steer is of small size said parts may assume the position shown in dotted lines, that is, may move so far forwardly that the passage behind the steer will be entirely closed by the extension 9 and the rearmost gate. In case, however, the steer is of greater size said frame and extension, and of course the connecting parts, will not yield so far, but will move inwardly sufficiently to clamp the steer tightly and firmly at its opposite sides between the frame 11 and the opposite side of the chute, and the extension 9 will close the passage behind him to such an extent that he cannot possibly back out, if he were so inclined. This would not probably happen, however, in any case, owing to the well-known fact that animals, and particularly cattle, will always endeavor to pass through a hole or opening in front of them. The steer by thus causing the frame to close upon him clamps himself in such a position that it is absolutely impossible for him to force said frame outwardly again, owing to the fact that the rack or toothed bar 34 automatically engages the rod or shoulder 38. If he struggles sufficiently he will only the more tightly and securely clamp himself in position. When he is thus secured with his head protruded through the opening formed by the yoke-frame, and also by the hinged bar 47, arranged at the front end of the chute and at the side opposite to the frame 11, it is obvious that by stepping through opening 6, formed in the chute, he may be easily branded at any desired point on one side or may be branded easily from the opposite side of the chute, owing to the fact that when he is clamped tightly in position his body naturally protrudes more or less through between the longitudinal rails or bars between which he is clamped. In case it is also desirable to dehorn him I have provided additional bars, upon which his head may be drawn tightly and secured. 48 designates one of these bars, and it is hinged to the front end of the chute at the side occupied by the frame, and near its opposite end is hinged or pivotally connected, as at 49, to the other or link bar 50, which at its opposite end is pivotally connected or hinged, as at 51, to the short bar 20 of the yoke-frame and in the same horizontal plane, and attached to a loop 52 or in any other suitable manner to said link-bar is a rope 53 for engagement round the neck or head of the steer. For convenience in arranging this rope around the steer's head, and also to escape any possible danger in so doing, I will preferably employ a supporting-pin 54, projecting outwardly from the bar 19, and a similar pin 55, projecting outwardly from the front end of the chute, upon which the rope may be arranged or draped, as shown clearly in Fig. 3, so that when the steer clamps himself in position in the manner hereinbefore explained he will also project his head through the noose or loop arranged to receive it. The free end of the rope will now be grasped and drawn tightly around his head or neck, so as to twist the latter and draw his head tightly down upon the said bars 48 and 50. The rope may then be given a turn around any projection or point of the chute, so as to absolutely prevent any movement at all of the steer. The horns may be removed now with ease and despatch and without any possible danger to the operator.

After either branding or dehorning a steer or both operations have been performed he may be released in an instant by simply grasping the handle end of the lever 31 and depressing the same. This, as hereinbefore explained, releases the bar 19 and the link 22 of the yoke-frame and at the same time operates or disengages the rack-bar from the rod or shoulder 38, when the pressure or struggle of the animal causes the frame 11 to swing back in an instant to its original position and the yoke-frame to swing to a longitudinal position upon the hinges 16. At the same instant the vertical bar 47 also swings forwardly and outwardly, as indicated by the arrow, Fig. 4, and the steer passes along through the chute. Immediately he passes out the yoke-frame is caused to again bridge and close the front end of the chute and the lever is elevated to cause the bolts or rods 26 and 27 to reëngage the eyebolts, as before, and thus secure it firmly and reliably in position, so that when the next steer comes along he may be trapped in the same manner. All succeeding operations are repetitions of that described.

In order to reliably keep the cattle on their feet when and after being caught in the chute, I have provided the downwardly-converging bars 56, which are secured longitudinally to the clamping-frame 11 and the opposing side of the chute at a suitable height. This arrangement will obviously tend to keep the cattle always upon their feet, so as to prevent breaking limbs, which might happen in case they should get down and continue to struggle and also facilitate their escape from the chute after being branded or dehorned.

It will thus be apparent that I have produced apparatus for automatically securing cattle in position to be branded or dehorned quickly and easily and without any possible chance of injury to the cattle, as often happens now by the methods employed. It will also be apparent that the apparatus embodies fully the advantageous features of simplicity, strength, durability, and inexpensiveness in a high degree. It is to be understood, of course, that slight changes in the form, proportion, or detailed construction and arrangement of the parts will not be considered a departure from the spirit and scope of my invention.

Having thus described my invention, what I claim as new therein, and desire to secure by Letters Patent, is—

1. In combination with a cattle-chute, a frame pivotally linked to one side of and within said chute, a yoke-frame pivotally connected to the front end of the first-named frame and detachably connected to the front end of the opposite side of the chute, which will yield when pressure is applied thereon by a steer and will consequently cause the inward movement of said first-named or swinging frame so as to clamp the steer more tightly between the same and the opposite side of the chute, and means to lock the swinging frame in such position, substantially as described.

2. In combination with a cattle-chute, a frame pivotally linked to one side of and within said chute, a yoke-frame pivotally connected to the front end of the first-named frame and detachably connected to the front end of the opposite side of the chute, which will yield when pressure is applied thereon by a steer and will consequently cause the inward movement of said first-named or swinging frame so as to clamp a steer tightly between the same and the opposite side of the chute, means to lock the swinging frame in such position, and downwardly-converging longitudinal bars securing the opposing sides of said frame of the chute in order to keep the steer upon his feet.

3. In combination with a cattle-chute, gates hinged to the inner side of the same, an extension for one of said gates, a longitudinal frame hinged to said gates and adapted by their movement to approach or recede from the opposite side of the chute, and a yoke-frame hinged to the front end of said longitudinal frame and detachably connected to the opposite side and front end of the chute whereby, when a steer comes against it it will yield and cause the longitudinal frame to move inward and the gate extension to close the rear end of the passage behind the steer, substantially as described.

4. In combination with a cattle-chute, gates hinged to the inner side of the same, an extension for one of said gates, a longitudinal frame hinged to said gates and adapted by their movement to approach or recede from the opposite side of the chute, a yoke-frame hinged to the front end of said longitudinal frame and detachably connected to the opposite side and front end of the chute whereby, when a steer comes against it it will yield and cause the longitudinal frame to move inward and the gate extension to close the rear end of the passage behind the steer, and means which lock said longitudinal frame and gate extension at any point in their adjustment.

5. In combination with a cattle-chute, gates hinged to the inner side of the same, an extension for one of said gates, a longitudinal frame hinged to said gates and adapted by their movement to approach or recede from the opposite side of the chute, a yoke-frame hinged to the front end of said longitudinal frame and detachably connected to the opposite side and front end of the chute whereby, when a steer comes against it it will yield and cause the longitudinal frame to move inward and the gate extension to close the rear end of the passage behind the steer, and means which lock said longitudinal frame and gate extension at any point in their adjustment, and means to trip said locking mechanism, and release the yoke-frame from its connection with the opposite side of the chute, whereby the steer may readily and easily escape from the chute.

6. In combination with a cattle-chute, gates hinged to the inner side of the same, an extension for one of said gates, a longitudinal frame hinged to the front end of said frame and bridging the front or discharge end of the chute; a yoke-frame hinged to the front end of said longitudinal frame, said yoke-frame comprising essentially an upper bar having a sliding pivotal connection with the opposite side and front end of the chute, a lower bar, and a link pivotally connected at one end to the front end of the opposite side of the chute and pivoted at its opposite end to said lower bar, so as to provide at this point a break-joint or yielding connection whereby when a steer protrudes his head through the yoke-frame and presses firmly against the same such joint will first yield or break and will thereby cause the longitudinal frame to clamp the steer firmly in position, substantially as described.

7. In combination with a cattle-chute, gates hinged to the inner side of the same, one of them having an extension, longitudinal frame hinged to the front end of said frame and bridging the front or discharge end of the chute; a yoke-frame hinged to the front end of said longitudinal frame, said yoke-frame comprising essentially an upper bar, a lower bar, and the link connected to said lower bar and provided at its opposite end with an eye, eyebolts projecting from the front end of the opposite side of the chute above and below the points of intersection of sides with the upper bar and the link and the yoke-frame, a lever, vertical bolts carried thereby and engaging said eyebolts outward of the upper bar so as to provide a sliding pivotal connection with the same, and engaging the eye and the link so as to provide a fixed pivotal connection with the same, substantially as described.

8. In combination with a cattle-chute, gates hinged to the inner side of the same, one of them having an extension, longitudinal frame hinged to the front end of said frame and bridging the front or discharge end of the chute; a yoke-frame hinged to the front end of the longitudinal frame, said yoke-frame comprising essentially an upper bar, a lower bar, and the link connected to said lower bar and provided at its opposite end with an eye, eyebolts projecting from the front end of the opposite side of the chute above and below the points of intersection of sides with the upper bar and the link and the yoke-frame, a lever, vertical bolts carried thereby and engaging said eyebolts outward of the upper bar so as to provide a sliding pivotal connection with the same, and engaging the eye and the link so as to provide a fixed pivotal connection with the same, a rack-bar pivotally connected to one of said gates and engaging a rod or shoulder secured to the chute, a trip-plate pivoted below the same, a lever pivoted upon the chute and linked to said trip-plate and also to the first-named lever, whereby when the latter is operated the bolts are withdrawn from their engagement with the eyebolts, and the trip-plate lifts the rack-bar from engagement with said rod or shoulder simultaneously, substantially as described.

9. In combination with a chute having an opening, gates hinged to the inner side of the chute at opposite sides of said opening, an extension for one of said gates, a swinging frame carried by said gates, a yoke-frame pivotally connected to the front end of said swinging frame and loosely and detachably connected to the front end and opposite side of the chute, and means to disconnect said yoke-frame from the front end of the chute, substantially as described.

10. In combination with a chute having an opening, gates hinged to the inner side of the chute at opposite sides of said opening, one of them provided with an extension, a swinging frame carried by said gates, a yoke-frame pivotally connected to the front end of said swinging frame and pivotally and detachably connected to the front end and opposite side of the chute, a bar hinged to the front end of the chute at the side occupied by the swinging frame, a link-bar pivotally connecting the same with the lower bar of the yoke-frame, and a rope for engagement round the neck of the steer, in order to secure him firmly in the desired position for dehorning purposes, substantially as described.

In testimony whereof I affix my signature in presence of two witnesses.

QUALLS BRUTON.

Witnesses:
H. E. PRICE,
G. Y. THORPE.